April 30, 1963   J. S. GOLIGHTLY   3,087,315
GLASS BENDING METHOD
Original Filed June 6, 1955   2 Sheets-Sheet 1
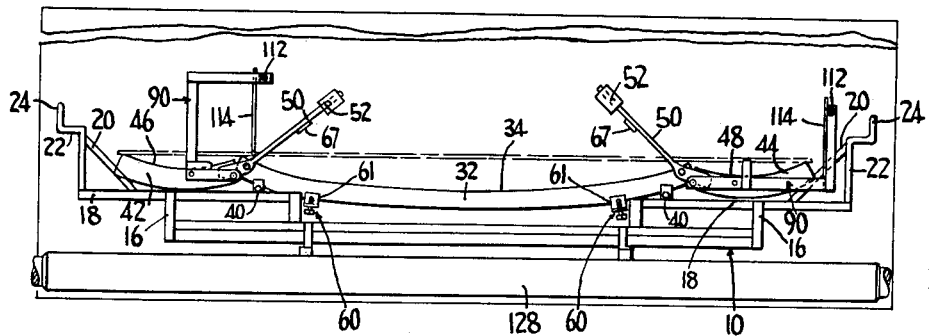
FIG. 1
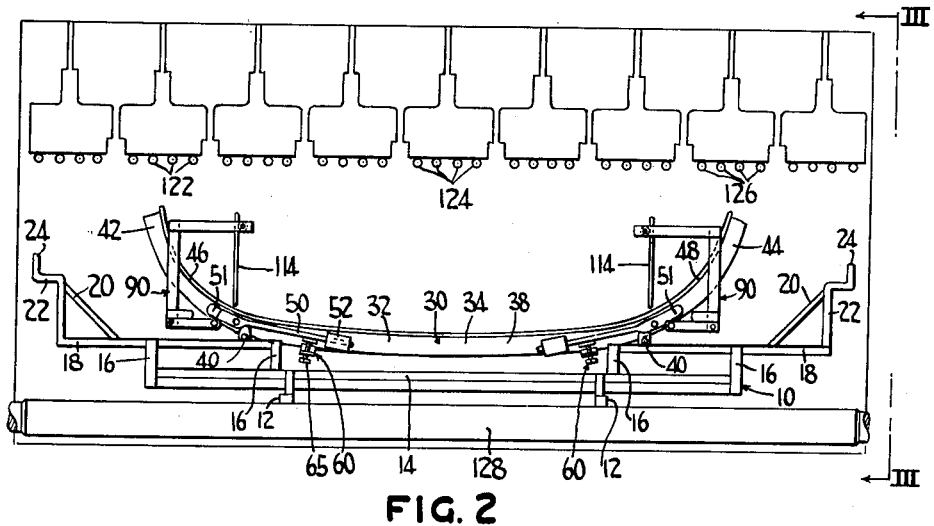
FIG. 2
FIG. 3
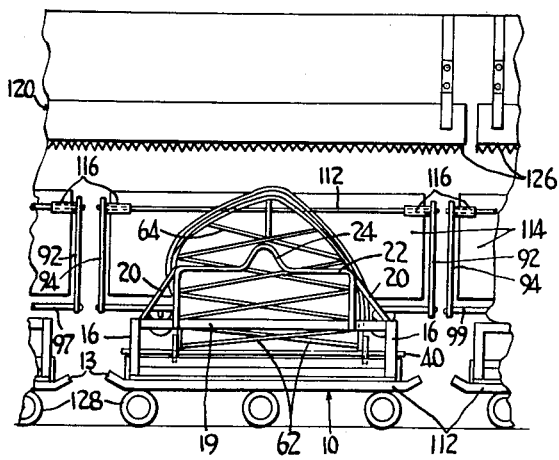
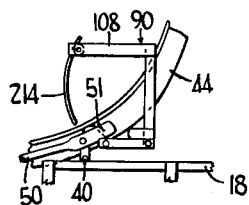
FIG. 6
INVENTOR.
JAMES S. GOLIGHTLY
BY Oscar L. Spencer
ATTORNEY April 30, 1963   J. S. GOLIGHTLY   3,087,315
GLASS BENDING METHOD Original Filed June 6, 1955   2 Sheets-Sheet 2

INVENTOR.
BY JAMES S. GOLIGHTLY
Oscar L. Spencer
ATTORNEY

United States Patent Office 3,087,315
Patented Apr. 30, 1963

3,087,315
GLASS BENDING METHOD
James S. Golightly, Tarentum, Pa., assignor to Pittsburgh Plate Glass Company, a corporation of Pennsylvania
Original application June 6, 1955, Ser. No. 513,465, now Patent No. 2,882,646, dated Apr. 21, 1959. Divided and this application July 24, 1958, Ser. No. 753,171
3 Claims. (Cl. 65—103)

The present invention relates to a novel glass bending method. In particular, the present invention relates to bending glass into "wrap-around" shapes provided with a gently curved central portion merging into regions having severe curvatures to form opposing longitudinal extremities in spaced planes substantially parallel to each other.

The present invention utilizes a special apparatus on the mold which effectively separates a bending lehr into three longitudinally extending compartments when the mold carries glass sheets through the lehr. The mold forms a central compartment, extending across the central region of the glass desired to be bent relatively gently, flanked by two longitudinally extending compartments wherein the glass extremities are conveyed. Separator members in the form of plates which extend beyond the side extremities of the bending mold form the walls separating the lehr compartments. These plates of the bending mold are pivoted for movement beyond the longitudinal extremities of the mold, or removable to allow flat glass sheets to be mounted on the mold for the bending operation.

It is a primary object of the present invention to provide a novel process for effecting the bending of flat glass sheets to wrap-around shapes more efficiently than prior art molds.

Another object of the invention is to provide a method for bending glass sheets into complex curvature having a gentle curve centrally merging into areas of severe curvature to form opposed extremities in spaced, substantially parallel planes.

Still another object is to utilize a bending mold with movable wall members capable of movement to one position to clear a mold for placing flat glass thereon and into another position to separate the central portion of the mold from its flanks, thus enabling different portions of glass sheets to be exposed to different intensities of heat in a bending lehr.

These and other objects of the present invention will be obvious from the following description taken in conjunction with the accompanying drawings which disclose particular embodiments of the present invention.

In the drawings accompanying the enclosed description,

FIGURE 1 is a front elevational view of a bending mold extended into an open position outside a glass bending lehr and supporting a flat sheet of glass prior to bending wherein the mold is provided with two elements forming part of the present invention, the left element in bending position, the right element in loading position;

FIGURE 2 is an elevational view showing the glass on the mold within the furnace after the glass has been bent;

FIGURE 3 is a partial end view along the lines III—III of FIGURE 2;

FIGURE 6 is a fragmentary elevational view similar to a portion of FIGURE 2, showing the structural details of an alternate embodiment of the invention.

Figure 4:
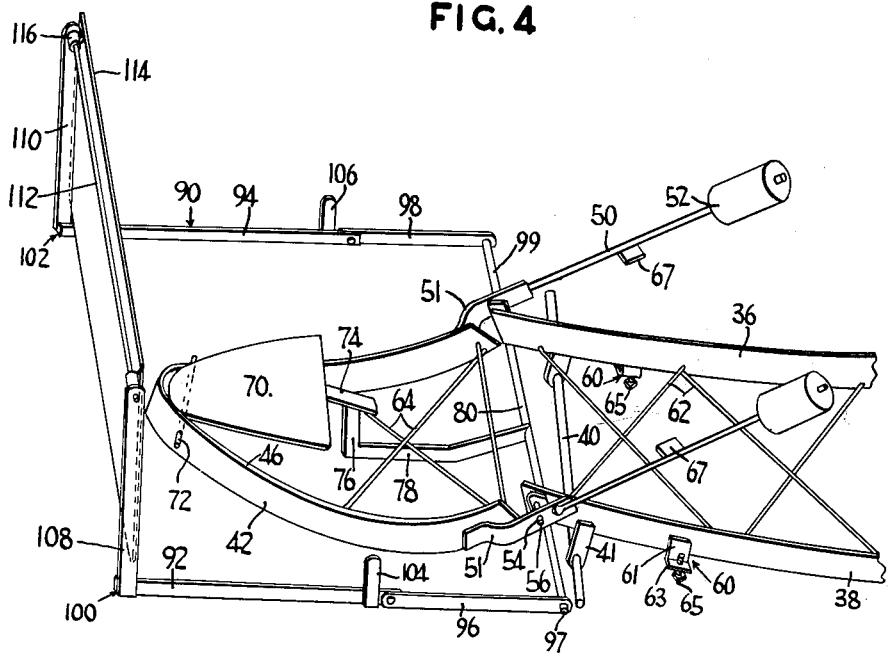
FIGURE 4 is a perspective view of a portion of the apparatus in open position to receive flat glass, showing certain elements in greater detail.

A typical bending mold includes a carrying frame 10 comprising cross rods 12 having upturned end portions 13, longitudinally extending support bars 14, vertical posts 16 connected at their bottom ends to the lower longitudinal support bars 14, and upper mold support bars 18 carried by the upper ends of the vertical posts 16. The carrying frame also includes end cross bars 19 extending transversely across the frame from the outboard extremities of opposing upper mold support bars 18. Diagonal bracing struts 20 interconnect the end cross bars 19 to semi-rectangular frame-shaped handles 22, provided with U-shaped portions 24 centrally thereof to facilitate their handling and storage.

Figure 5:
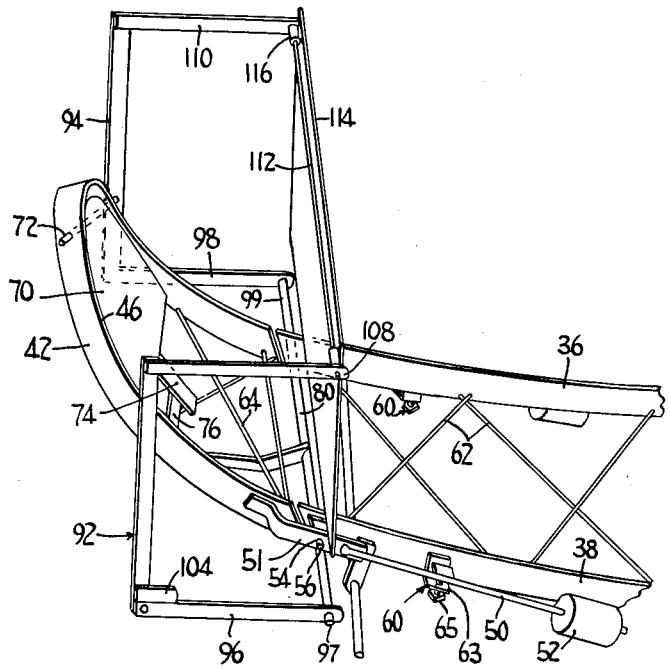
FIGURE 5 is a similar view of the portion of the apparatus shown in FIGURE 4, but depicting the position of the elements after the mold has assumed its curved shape.

The mold 30 comprises a central molding member 32 having an upper shaping surface 34 formed by the upper edges of two spaced, longitudinally extending side rails 36, 38 (FIGURES 4 and 5). A pair of cross rods 40, connected adjacent each end thereof to fingers 41 extending downwardly from the side rails, interconnect the rails of the center molding member 32 adjacent each longitudinal extremity thereof. Cross rods 40 are mounted upon upper mold support bars 18 of the carrying frame when the mold is mounted upon the carriage for supporting glass sheets to be bent in a bending lehr.

At each outboard extremity of the center molding member 32, there is an outboard molding member 42 and 44 respectively. These outboard molding members are substantially C-shaped in outline and have upper shaping surfaces 46 and 48 respectively, which conform in elevation to the shape desired for the glass sheet extremities. At each lateral extremity of each outboard molding member at its inboard longitudinal extremity, an extension arm 50 is provided. The latter includes a brace 51 at its outboard extremity secured to the outboard molding member and a counterweight 52 at its inboard extremity. Each brace is apertured at 54 to receive a stub axle rod 56 fixed to the longitudinal extremity of the center molding member 32. (See FIGURE 4.) The apertures 54 and the stub axle rods 56 provide pairs of bearings enabling the outboard molding members 42 and 44 to rotate relative to the center molding member 32. The counterweights 52 urge the outboard molding members to rotate into a mold position whereby the upper shaping surfaces 34, 46 and 48 of the various molding members provide a substantially continuous surface conforming in elevation and outline to the contour desired for the bent glass sheet.

Suitable pairs of stop members 60 are provided to insure that the outboard molding members do not rotate beyond the position required to form the curved frame desired. Each pair may include an L-shaped member 61 attached to the outer side of each rail 36 and 38 at each outboard extremity thereof, containing an apertured flange 63 through which an adjustable screw 65 may be fixed in position. The extension arms 50 each contain an extension plate 67. The latter contact the screws 65 of the various stop members 60 when the outboard molding members have rotated the desired amount, thus precluding additional undesirable rotation.

Bracing members 62 are interconnected between rails 36 and 38 of the center molding member 32. Bracing rods 64 interconnect the opposite sides of the C-shaped outboard members 42 and 44 for reinforcement purposes.

Heat abstractor plates 70 may be pivotally mounted upon rods 72 extending across the outboard extremity of the outboard molding members 42 and 44. Plates 70 are each provided with an inwardly extending tongue 74 which slides at the upper extremity of an upwardly extending leg 76 of a J-shaped member 78 attached to a cross rod 80 at the outboard extremity of the center molding member 32.

A pivotable connecting frame 90, which comprises spaced, jointed straps 92, 94 comprising hinge links 96 and 98 and angular arms 100 and 102, is pivotally connected at the inboard end of the jointed straps to stub axles 97 and 99, which may be outboard extensions of cross rod 80. Arm 100 comprises a lug 104 and arm 102 comprises a lug 106 at one end and angular extensions 108 and 110 at its other end, respectively. A hinge bar 112 is connected between the extremities of the angular extensions 108 and 110. A plate 114 is rotatably mounted on each hinge bar 112, with sleeves 116 providing a bearing action with respect to the hinge bar 112.

When the pivoted connecting frames 90 are rotated to an outboard position shown in FIGURE 4, the plates 114 hang beyond the longitudinal extremities of the mold, thus facilitating mounting of flat glass sheets prior to bending. After the glass sheet or sheets are mounted on the mold for bending, the frames 90 are then rotated inwardly into a vertical position to form walls 114 extending transversely of the glass at opposite longitudinal extremities of the region to be bent to a slight curvature.

Referring to FIGURE 3, it is seen that the width of the plates 114 is greater than that of the carriage or of the bending molds. Hence, hinge bar 112 should preferably be in substantial vertical alignment with the axis formed by stub axle rods 56 to allow the counterweighted extension arms 50 to rotate clear of the plates 114.

When the glass laden molds are inserted into a glass bending lehr 120 provided with electrical heating elements 122, 124, the cross braces 12 of the carrying frame 10 are supported upon lehr rolls 128 which drive the carrying frames through the lehr. Thus, plates 114 provide a substantially continuous wall separating the lehr 120 into three longitudinally extending chambers.

The center section is heated by central heating elements 124, (FIGURE 2), whereas the flanking longitudinally extending chambers on the outboard sides of the roll formed by the reflector plates 114 are heated by electric heating elements 122 and 126 respectively.

Therefore, after the glass and the mold have passed through a preheating section wherein the glass and mold are heated to a substantially uniform temperature above the minimum of the annealing range but below glass softening temperatures, and conveyed to the bending section of the lehr, where the glass is subjected to its softening temperature. In this section, the central chamber may be heated by electric heating elements 124 to a lower temperature than the outboard chambers heated by elements 122 and 126. Thus, the glass is bent more quickly in those regions requiring a severe bend and is bent less severly in those regions requiring a gentle curving of the glass.

The plates 114 not only provide a substantially continuous barrier which provides thermal insulation between the longitudinally extending chambers of the bending section of the lehr, but also concentrate, the reflected heat onto the regions of the glass where the bending requirements are most severe. This is done by making the plates 114 of reflective material such as aluminum or stainless steel. The plates may accentuate this concentration of heat into the critical region of the glass by being curved in elevation as seen in the curved plate 214 of FIGURE 6, which may be substituted for the flat plates 114. In plates 214, the outboard surfaces are concave and the inboard surfaces convex. This embodiment not only provides a substantially continuous barrier within the lehr, but also enables the heat reflected into the flanking chambers to be focused along a line of the glass wherein maximum curvature is desired.

With such apparatus it is possible to apply different intensities of heat to the different portions of the glass sheet during the bending operation and to utilize the energy consumed by the lehr more efficiently than formerly.

The above description of certain embodiments of apparatus useful for performing glass bending methods in accordance with the present invention is for illustration rather than limitation. For example, the bending mold may be used with gas or other types of heaters rather than the electrical heaters disclosed in the particular examples described. As an additional example, plates 114 or 214 may be removed entirely rather than pivoted for glass loading purposes. Other obvious modifications may be made within the scope of this invention as defined by the accompanying claims.

The present application is a division of application Serial No. 513,465, filed June 6, 1955, for Glass Bending Mold and Method, which has matured into U.S. Patent No. 2,882,646 on April 21, 1959.

What is claimed is:

1. In a method of bending elongated glass sheets into shapes having a substantially gently curved central portion merging into regions having severe curvature to form longitudinal extremities bent severely relative to said central portion, said method comprising supporting a flat glass sheet in a support plane above a suitable shaping surface, and conveying the glass sheet laterally through a hot atmosphere and heating the portion to be gently curved comparatively moderately by exposing said portion to comparatively moderate heat sources while heating the regions to have severe curvature comparatively intensely by exposing said regions to comparatively intense heat sources for a time sufficient to heat-soften the glass sheet into conformity with the shaping surface, the improvement comprising interposing heat reflective material between said comparatively intense heat sources and said portion of the glass sheet to be gently curved in spaced relation to said portion and orienting said heat reflective material in such a position relative to said comparatively intense heat sources, said portion of the glass sheet to be gently curved and said regions of the glass sheet to have severe curvature that a portion of the heat imparted from said comparatively intense heat sources that would normally heat said portion of the glass sheet to be gently curved is shielded from said portion and instead is reflected onto said regions to have severe curvature.

2. In the method of bending elongated glass sheets to non-uniform curvatures including a substantially gently curved portion and a region of severe curvature wherein a glass sheet is supported in a support plane above a suitable shaping surface and conveyed laterally through a hot atmosphere wherein said portion to be gently curved is heated comparatively moderately by exposing said portion to comparatively moderate heat sources while the region to have severe curvature is heated comparatively intensely by exposing said region to comparatively intense heat sources for a time sufficient to heat-soften the glass sheet into conformity with the shaping surface, the improvement comprising interposing heat reflective material between said comparatively intense heat sources and said portion of the glass sheet to be gently curved in spaced relation to said portion and orienting said heat reflective material in such a position relative to said comparatively intense heat sources, said portion of the glass sheet to be gently curved and said region of the glass sheet to have severe curvature that a portion of the heat imparted from said comparatively intense heat sources that would normally heat said portion of the glass sheet to be gently curved is shielded from said portion and instead is reflected onto said region to have severe curvature.

3. The improvement according to claim 2, wherein the portion of heat that is reflected onto said region of severe curvature is focused onto a selected portion of said region.

References Cited in the file of this patent

UNITED STATES PATENTS

| | | |
|---|---|---|
| 2,176,999 | Miller | Oct. 24, 1939 |
| 2,215,228 | Oliver | Sept. 17, 1940 |
| 2,348,905 | Hopfield | May 16, 1944 |
| 2,450,297 | Pearse et al. | Sept. 28, 1948 |
| 2,452,488 | Paddock et al. | Oct. 26, 1948 |
| 2,646,647 | Bamford et al. | July 28, 1953 |
| 2,671,987 | Jendrisak | Mar. 16, 1954 |

FOREIGN PATENTS

| | | |
|---|---|---|
| 142,697 | Australia | Apr. 7, 1944 |
| 727,200 | Great Britain | Mar. 30, 1955 |